United States Patent [19]

Bossen et al.

[11] Patent Number: 5,552,591

[45] Date of Patent: Sep. 3, 1996

[54] PRESENCE/ABSENCE BAR CODE

[75] Inventors: Douglas C. Bossen, Poughkeepsie; Chin-Long Chen, Wappingers Falls; Frederick H. Dill, South Salem; Douglas S. Goodman, Yorktown Heights; Mu-Yue Hsiao, Poughkeepsie; Paul V. McCann, Hopewell Junction; James M. Mulligan, Poughguag; Ricky A. Rand, Somers, all of N.Y.

[73] Assignee: International Business Machines Corporation, Armonk, N.Y.

[21] Appl. No.: 21,298

[22] Filed: Feb. 22, 1993

Related U.S. Application Data

[63] Continuation of Ser. No. 796,163, Nov. 22, 1991, abandoned, which is a continuation of Ser. No. 351,902, May 15, 1989, abandoned.

[51] Int. Cl.⁶ ............................................. G06K 7/10
[52] U.S. Cl. ............................................. 235/462; 235/470
[58] Field of Search ............................. 235/462, 470

[56] References Cited

U.S. PATENT DOCUMENTS 4,680,457  7/1987  Robertson .
4,833,306  5/1989  Milbrett .

*Primary Examiner*—Harold Pitts
*Attorney, Agent, or Firm*—Lawrence D. Cutter

[57] ABSTRACT

A single width bar code exhibiting inherent self clocking characteristics is provided so as to be particularly useful in the identification of semiconductor wafers in very large scale integrated circuit manufacturing processes. The codes described herein are robust, reliable and highly readable even in the face of relatively high variations in scanning speed. The codes are also desirably dense in terms of character representations per linear centimeter, an important consideration in semiconductor manufacturing wherein space on the chips and the wafer is at a premium. Additionally, a preferred embodiment of the present invention exhibits a minimum number for the maximum number of spaces between adjacent bars in code symbol sequences.

10 Claims, 5 Drawing Sheets

CHARACTER FONT BAR PATTERNS
CODE BC412

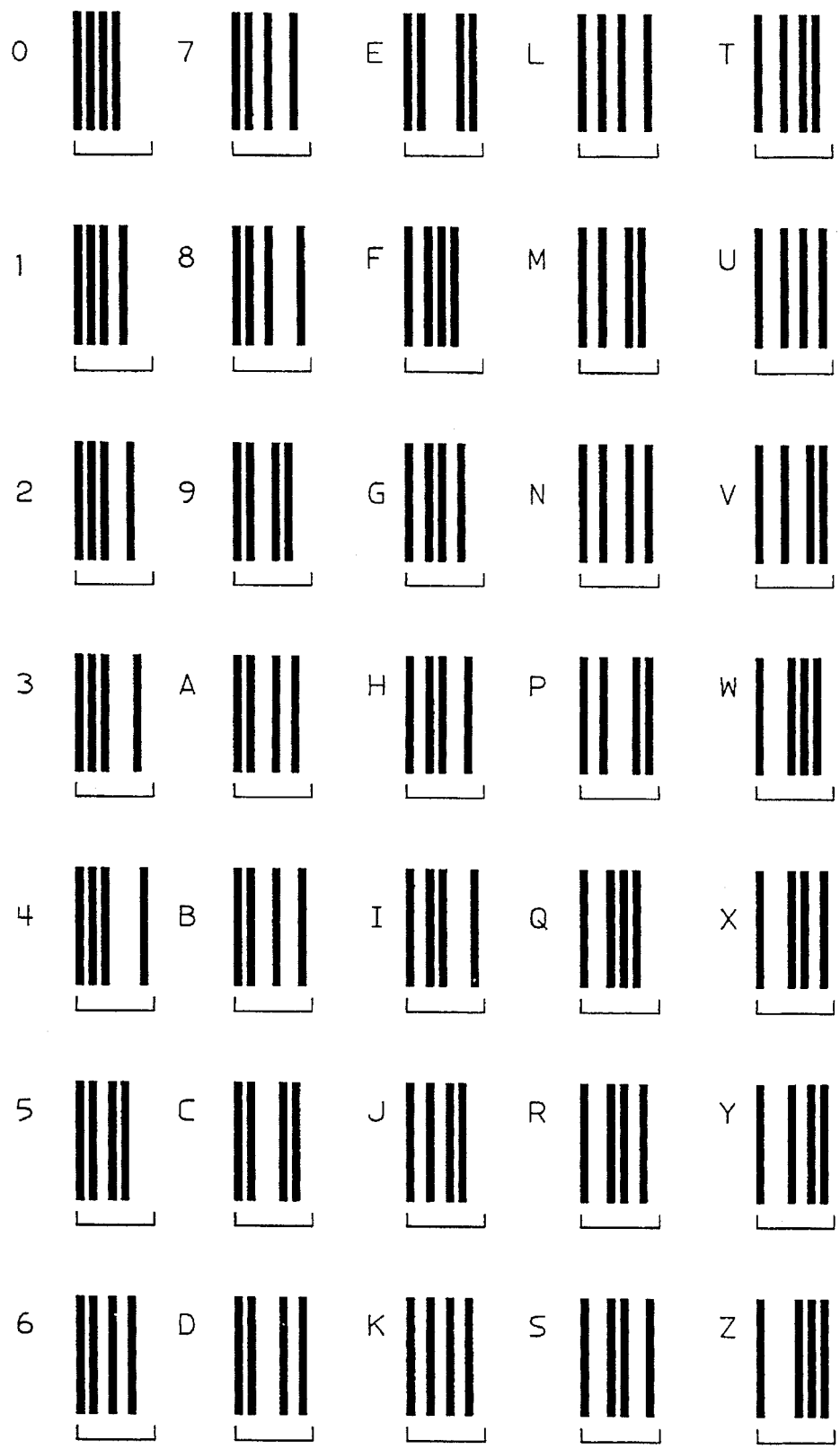
FIG.1 CHARACTER FONT BAR PATTERNS CODE BC412

FIG. 2A

VARIOUS SINGLE WIDTH BAR CODES

| CHARACTER | BC412 | BC313 |
|---|---|---|
| 0 | I-I-I-I----- | I-I-I------- |
| 1 | I-I-I--I---- | I-I--I------ |
| 2 | I-I-I---I--- | I-I---I----- |
| 3 | I-I-I----I-- | I-I----I---- |
| 4 | I-I-I-----I- | I-I-----I--- |
| 5 | I-I--I-I---- | I-I------I-- |
| 6 | I-I--I--I--- | I-I-------I- |
| 7 | I-I--I---I-- | I-I--------I |
| 8 | I-I--I----I- | I--I-I------ |
| 9 | I-I---I-I--- | I--I--I----- |
| A | I-I---I--I-- | I--I---I---- |
| B | I-I---I---I- | I--I----I--- |
| C | I-I----I-I-- | I--I-----I-- |
| D | I-I----I--I- | I--I------I- |
| E | I-I-----I-I- | I--I-------I |
| F | I--I-I-I---- | I---I-I----- |
| G | I--I-I--I--- | I---I--I---- |
| H | I--I-I---I-- | I---I---I--- |
| I | I--I-I----I- | I---I----I-- |
| J | I--I--I-I--- | I---I-----I- |
| K | I--I--I--I-- | I---I------I |
| L | I--I--I---I- | I----I-I---- |
| M | I--I---I-I-- | I----I--I--- |
| N | I--I---I--I- | I----I---I-- |
| O |  | I----I----I- |
| P | I--I----I-I- | I----I-----I |
| Q | I---I-I-I--- | I-----I-I--- |
| R | I---I-I--I-- | I-----I--I-- |
| S | I---I-I---I- | I-----I---I- |
| T | I---I--I-I-- | I-----I----I |
| U | I---I--I--I- | I------I-I-- |
| V | I---I---I-I- | I------I--I- |
| W | I----I-I-I-- | I------I---I |
| X | I----I-I--I- | I-------I-I- |
| Y | I----I--I-I- | I-------I--I |
| Z | I-----I-I-I- | I--------I-I |

FIG. 2B
VARIOUS SINGLE WIDTH BAR CODES

| CHARACTER | BC411 | BBC31 | BC311 |
|---|---|---|---|
| 0 | I-I-I-I---- | --------I- | I-I-I------ |
| 1 | I-I-I--I--- | ------I--- | I-I--I----- |
| 2 | I-I-I---I-- | ------I-I- | I-I---I---- |
| 3 | I-I-I----I- | ----I----- | I-I----I--- |
| 4 | I-I--I-I--- | ----I---I- | I-I-----I-- |
| 5 | I-I--I--I-- | ----I-I--- | I-I------I- |
| 6 | I-I--I---I- | ----I-I-I- | I--I-I----- |
| 7 | I-I---I-I-- | --I------- | I--I--I---- |
| 8 | I-I---I--I- | --I-----I- | I--I---I--- |
| 9 | I-I----I-I- | --I---I--- | I--I----I-- |
| A | I--I-I-I--- | --I---I-I- | I--I-----I- |
| B | I--I-I--I-- |  | I---I-I---- |
| C | I--I-I---I- | --I-I----- | I---I--I--- |
| D | I--I--I-I-- | --I-I---I- | I---I---I-- |
| E | I--I--I--I- | --I-I-I--- | I---I----I- |
| F | I--I---I-I- | --I-I-I-I- | I----I-I--- |
| G | I---I-I-I-- | I--------- | I----I--I-- |
| H | I---I-I--I- | I-------I- | I----I---I- |
| I | I---I--I-I- |  | I-----I-I-- |
| J | I----I-I-I- | I-----I--- | I-----I--I- |
| K | -I-I-I-I--- | I-----I-I- | I------I-I- |
| L | -I-I-I--I-- | I---I----- | -I-I-I----- |
| M | -I-I-I---I- | I---I---I- | -I-I--I---- |
| N | -I-I--I-I-- |  | -I-I---I--- |
| O |  |  | -I-I----I-- |
| P | -I-I--I--I- | I---I-I--- | -I-I-----I- |
| Q | -I-I---I-I- | I---I-I-I- | -I--I-I---- |
| R | -I--I-I-I-- | I-I------- | -I--I--I--- |
| S | -I--I-I--I- | I-I-----I- | -I--I---I-- |
| T | -I--I--I-I- | I-I---I--- | -I--I----I- |
| U | -I---I-I-I- | I-I---I-I- | -I---I-I--- |
| V | --I-I-I-I-- |  | -I---I--I-- |
| W | --I-I-I--I- | I-I-I----- | -I---I---I- |
| X | --I-I--I-I- | I-I-I---I- | -I----I-I-- |
| Y | --I--I-I-I- | I-I-I-I--- | -I----I--I- |
| Z | ---I-I-I-I- | I-I-I-I-I- | -I-----I-I- |

FIG. 3A
BARCODE MARKS (ACID ETCH)
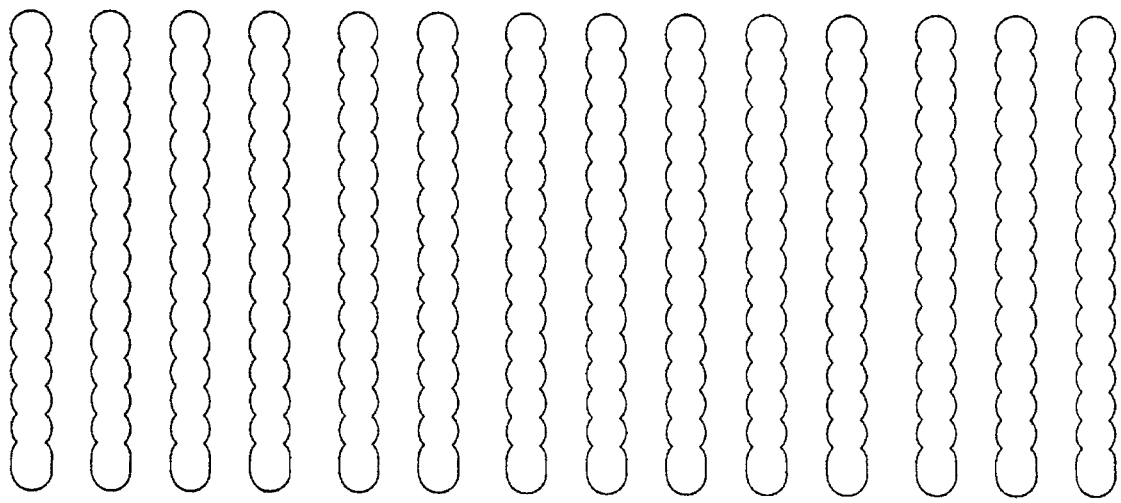
FIG. 3B  BARCODE MARKS (ALKALINE ETCH)
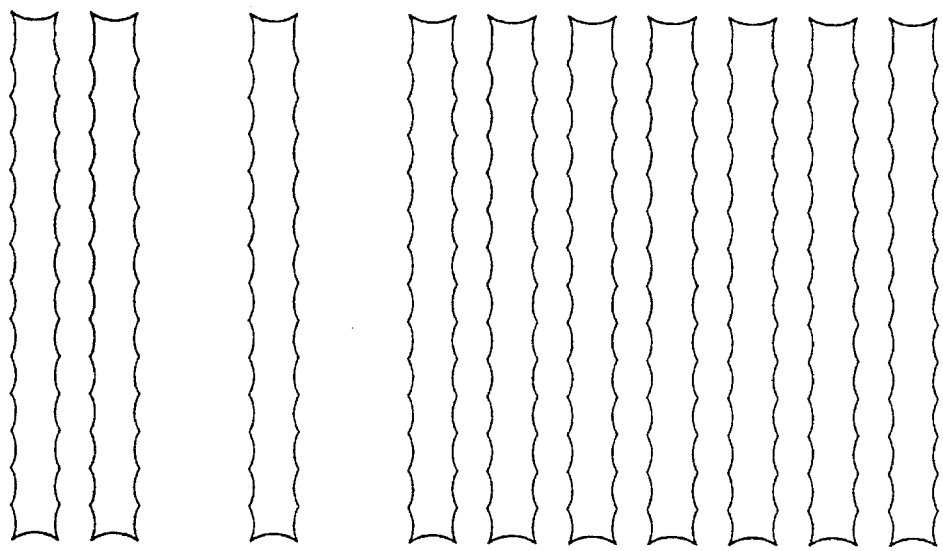

PRESENCE/ABSENCE BAR CODE

The present application is a continuation of application Ser. No. 07/796,163 filed Nov. 22, 1991 now abandoned which is a continuation of application Ser. No. 07/351,902 filed May 15, 1989, now abandoned.

BACKGROUND OF THE INVENTION

The present invention is generally directed to bar code configurations which are useful for representing alphanumeric data. More particularly, the present invention is directed to bar codes in which the bars exhibit uniform single with dimensions and specific periodicity and which are coded to include a subsequence of timing marks to enhance readability. Even more particularly, the present invention is related to high density bar code systems which are employable during the manufacture and processing of semiconductor wafers used in the fabrication of electronic circuit chips, such as those that are produced in very large scale integrated (VLSI) circuit manufacturing processes.

Bar code fonts for representing symbol data, particularly alphanumeric symbols, are very desirable since they provide a mechanism for machine readability which does not depend upon optical character recognition (OCR) systems. In general OCR systems tend to be more error prone than bar code systems. However, bar code systems are nonetheless susceptible to certain error conditions. One example of this is the partial covering of the bar code with opaque films or the reducing of the contrast ratio which makes it more difficult to distinguish between wide and narrow width bars. As an example, if the scanning speed in a bar code reader is not absolutely constant a long gap of spaces between bars is more likely to produce a reading error. Bar codes which have a large number of blank spaces between bars are particularly subject to this kind of error. For example, in certain bar codes a 3% speed variation is sufficient to produce reading errors. Accordingly, it is seen that it is desirable to be able to construct bar code systems in which there is a significant reduction in sensitivity to scanning speed variation.

A number of bar codes employ bars having a plurality of different widths. However, there are certain disadvantages associated with multi-width bar code fonts. In particular, their density, for example as measured in characters per inch, is not as high as one could obtain in a font which only exhibited a single width bar. Furthermore, in bar code systems employing multiple bar widths, it is necessary that the circuitry discern each bar's width or at least the width ratio between bars. Modulated bar widths also introduce writing problems when scribing is carried out with a pulsed laser to form the image. Wide bars, tat is, bars with widths greater than the width of a laser spot, yield a lower quality bar image and require a much longer writing time. For this reason, modulated bar width codes also pose a greater risk of damage to the wafer because of the increased laser radiation concentration. Furthermore, when pulsed lasers are used to write on semiconductor wafers in dot matrix fashion, there is a tendency for a trench to form which throws off the laser used for reading the imparted signal. Thus, modulated bar width systems tend to introduce readability problems when there is a writing quality problem, bar image degradation or low contrast such as might occur in the identification of semiconductor wafer serial numbers.

Single width bar codes are employed but require the simultaneous use of separate timing marks. The single width bar codes therefore require twice the space, plus dual readers. A typical example of such a code is found on certain envelopes as coded by the United States Postal Service. Dual readers are not only more expensive, but the code that they employ takes up more room on a wafer. This room is much more advantageously given over to a human readable version of the code.

While the present invention is generally directed to bar code reading systems having a wide range of applicability to manufacturing, marketing, sorting and identification functions, it is particularly applicable to the identification of semiconductor wafers. In particular, in the manufacture of very large scale integrated circuit devices, that is, chips produced from processed wafers of material such as silicon, it is necessary to employ a code that can be efficiently written and which is robust under the exigencies of processing in unusually harsh environments. Such codes are required to be robust and satisfy the need for representing the full range of alphanumeric characters, A through Z and 0 through 9. This set constitutes a total of 36 characters. However, the letter "O" is often deleted from the required set leaving a total of 35 characters which usually need to be represented and/or distinguished. Additionally, because of size constraints that exist in the manufacture of semiconductor devices it is very desirable that codes employed exhibit a high density. Thus codes which require a separate set of timing marks are undesirable because of the space that the timing marks require.

Furthermore, codes which are suitable for semiconductor chip processing generally should be easy to write on a wafer during processing and should likewise be easily read during wafer or chip processing. Furthermore, the bar code font employed should be such that it is able to withstand processing conditions, namely exposure to sometimes harsh chemicals and high temperature environments. Furthermore, it is desirable to employ codes which can be written by means of a pulsed laser. Such robust and highly reliable codes are desired for wafer fabrication processes to facilitate automatic wafer handling, processing and process parameter identification. Furthermore, it is seen that codes that are developed for such processes would also possess a wide range of applicability in other areas in which bar codes are presently employed.

SUMMARY OF THE INVENTION

In accordance with a preferred embodiment of the present invention a method for marking a substrate with a bar code comprises the step of providing a sequence of uniform width marks at selectively spaced intervals. Each of the marks possesses substantially the same width $W_1$, with blank intervals between the marks. The blank intervals have a width which is substantially equal to an integral multiple of a second width $W_2$, which represents the width of a single blank space. Nonetheless, the method of the present invention employs a single width bar. Furthermore, in accordance with the present invention, the sequence of marks is such that it includes a subsequence which is spaced apart from adjacent marks in the subsequence by a fixed distance. This provides a means for timing recovery and/or timing compensation. In accordance with a particular embodiment of the present invention each character or symbol is represented by a sequence of n=12 marks and/or spaces. This permits the representation of up to 35 or 36 different symbols which is sufficient for alphanumeric representation. Furthermore, the present invention preferably employs bar codes in which the marks are spaced to represent a number of different symbols in such a way that the largest distance between adjacent bars for different symbols is a minimum. In a preferred embodiment of applicants' invention this minimum distance is five bar widths. This latter feature of the invention reduces the occurrence of sequences of symbols in which wide gaps having no bars are produced. Additionally, the present invention is also directed to a substrate marked in accordance with the method described above and includes substrates having such identification marks thereon.

Accordingly, it is an object of the present invention to provide a high density bar code system, as measured for example in terms of characters per centimeter.

It is also an object of the present invention to provide a high density bar code which is particularly suitable for use in the identification of wafers and/or chips in semiconductor manufacturing processes.

It is yet another object of the present invention to devise a single width, self clocking bar code which is both robust and reliable.

It is a still further object of the present invention to provide bar codes which are employable in harsh environments and which can be readily written on materials employed in semiconductor manufacture generally and in particular on materials such as silicon.

It is still another object of the present invention to provide bar code systems which exhibit single width bars and yet are self clocking.

It is also an object of the present invention to provide a bar code which exhibits a minimum distance value from amongst all of the largest distances between adjacent bars in sequences of different symbols.

It is a still further object of the present invention to provide a bar code system which is capable of representing up to 35 or 36 different symbols, such as the 36 alphanumeric symbols A through Z and 0 through 9.

Lastly, but not limited hereto, it is an object of the present invention to provide an easily read and easily written bar code having universal applicability to product identification.

DESCRIPTION OF THE FIGURES

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 illustrates a bar code system which is preferred in the present invention;

FIG. 2A is an illustration of two single width bar codes with built-in timing marks, in accordance with the present invention;

FIG. 2B is an illustration of three single width bar codes without built-in timing marks;

FIG. 3A is a planar view of acid etched bar code marks on a semiconductor substrate;

FIG. 3B is a view similar to FIG. 3A except illustrating the utilization of an alkaline etch;

DETAILED DESCRIPTION OF THE INVENTION

Figure 4A:
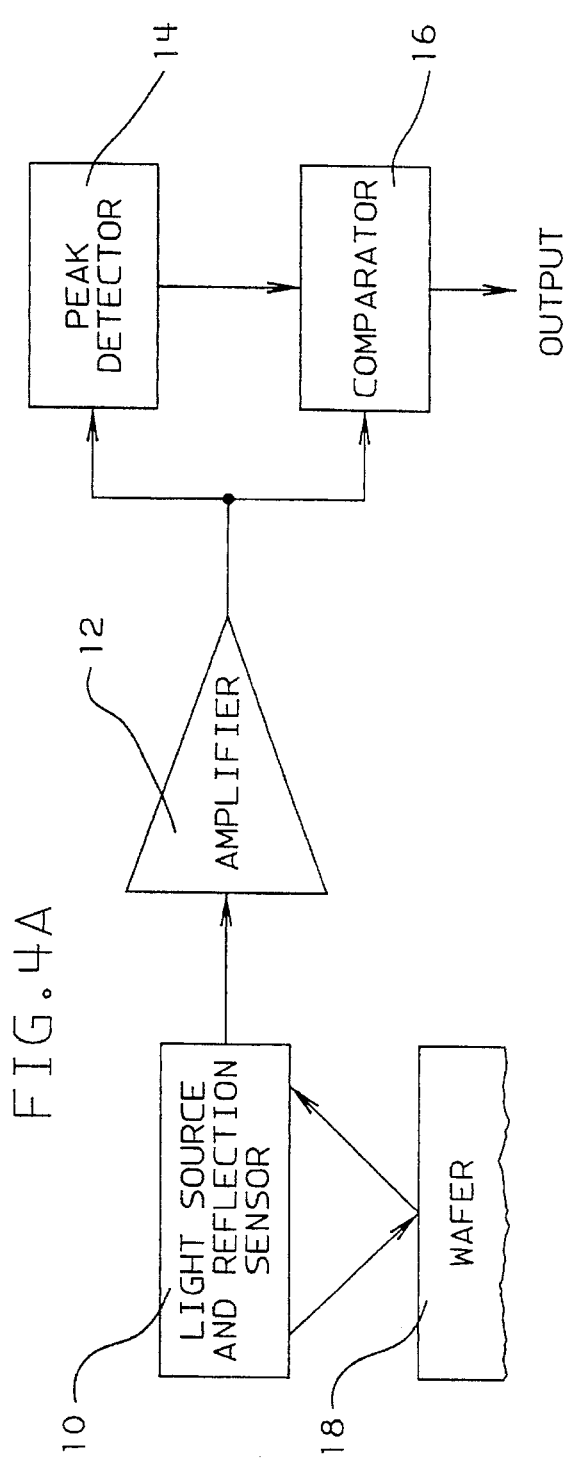
FIG. 4A is an illustration of a system which is capable of reading codes produced in accordance with the present invention.

FIG. 1 illustrates a preferred embodiment of the present invention. In particular, FIG. 1 illustrates a presence/absence single width bar code which is capable of representing the numeric digits 0 through 9 and the alphabetic characters A through Z (without the character "O"). This particular code is therefore seen to be able to represent 35 distinct symbols. The flattened U-shaped channel mark at the bottom of each of the bar code symbols is shown only for convenience to point out the fixed distance that each set of bar code symbols occupies. In particular, it is to be noted that each code symbol character occupies the same horizontal distance and is made up of a plurality k, of single width vertical bars and n–k correspondingly sized spaces between these bars, where n is the number of bars and spaces in each character. Furthermore, when compounded together in a sequence of alphanumeric characters, it is seen that the first bar in each code forms part of a subsequence of bars which is capable of providing timing information. Other aspects of the bar code shown in FIG. 1, and designated herein as BC412, are more particularly discussed below in comparison with other single width bar codes.

In particular, consideration is now directed to FIGS. 2A and 2B which illustrate a variety of single width bar codes including code BC412 discussed above. In particular, FIGS. 2A and 2B illustrate the presence of a bar in the code in the form of the letter "I". Spaces or absences of bars are illustrated by hyphens, "-". In particular, it is noted that code BC412 shown in FIG. 2A always begins with a "I-" sequence. In this case, these two code symbols constitute two elements of a subsequence which is repeated in any concatenation of bar code symbols. In code BC412 it is seen that the total number n, of code elements is 12 so as to make this particular code one which is of fixed length. Furthermore, amongst these 12 slots (elements) where bars could be present or absent there are always a total of 4 bars per alphanumeric character, a fact which is again helpful in establishing or reestablishing timing control. Correspondingly, each symbol includes a total of 8 spaces (bar absences) per character symbol. Code BC412 is thus seen to be capable of representing 35 characters which is sufficient for most alphanumeric applications. Most importantly for code BC412, the maximum number of spaces between bars in any concatenated sequence of code symbols is 5. This means that there are no long runs of blank spaces between adjacent bars. This significantly improves the readability and reliability of such bar codes. There is also a minimum of one space between bars. Therefore the first and last elements a bar and space, respectively. In particular, it is seen that bar codes in which the maximum number of spaces between bars is a minimum is preferred for purposes of controlling sensitivity to speed variation in the reading device. The reason for this is that when a reading device reads the bar/space sequence, the device detects the presence of bars, and derives the number of spaces between the bars from the scanning speed and time. If the scanning speed is not absolutely constant, a long gap of spaces between bars is more susceptible to the production of reading errors. An example of this is the BBC31 code, as seen in FIG. 2B, having up to 17 spaces between bars. A code such as this is subject to reading errors at a mere 3% speed variation. In contrast however the BC412 code, with only a maximum of 5 spaces between bars is capable of readability even at an 8% variation in speed. This is a significant advantage for the BC412 code.

Another bar code in accordance with the present invention is illustrated by the code labeled BC313 in FIG. 2A. For the same reasons given above with respect to code BC412, code BC313 is also seen to possess timing indicia which are inherent in the code structure. Thus codes such as BC412 and BC313, as shown, do not require the presence of a separate set of timing marks. Code BC313 however possesses one more element per symbol than code BC412. Nonetheless it is fully capable of representing a full alphanumeric character set of 36 different symbols. Code BC313 is seen to include a total of three bars per character and a total of 10 spaces per character. Additionally, the maximum number of spaces between bars is 8 which is higher than the corresponding maximum distance for code BC412. Nonetheless both codes BC412 and BC313 represent single width bar codes with built-in timing recovery subsequences. It is further seen that codes BC412 and BC313 each possess sufficient inherent and discernible structure so as to readily permit their extension to codes where the number of elements per character represented is greater than twelve.

FIG. 2B also illustrates several other single width bar codes namely code BC411, code BBC31 and code BC311. While these are all illustrations of single width bar codes, it is seen that they do not possess the desired self clocking feature. Furthermore, code BBC31 appears to be particularly lacking in the range of different symbols it is capable of representing namely 31, as opposed to 35 or 36. The attributes of the various codes shown in FIGS. 2A and 2B are listed below in Table I:

TABLE I

|  | BC411 | BC412 | BBC31 | BC311 | BC313 |
|---|---|---|---|---|---|
| # of elements | 11 | 12 | 10 | 11 | 13 |
| # Bars/Character | 4 | 4 | 1 to 5 | 3 | 3 |
| # Spaces/Character | 7 | 8 | 5 to 9 | 8 | 10 |
| Max. # Spaces between bars | 7 | 5 | 17 | 7 | 8 |
| Timing Bar | No | Yes | No | No | Yes |
| # Characters | 35 | 35 | 31 | 36 | 36 |

It is to be particularly noted that among the four codes in Table I that have a fixed number of bars, code BC412 has the least number for the maximum number of spaces between bars, that is, five spaces. This is a highly desirable characteristic as noted above. It is also seen that codes such as BBC31 do not even possess the desirable property of having a fixed number of bars or spaces per symbol character represented.

The system of the present invention is particularly applicable to the marking of semiconductor materials for identification during processing. The application of single width character fonts provides a higher code density, simpler writing methods plus easier reading because the reading system only has to recognize the presence or absence of a bar, without having to discern the bar's width or the width ratio between bars. As applied to silicon wafers, the bar widths are typically between about 0.10 millimeters and 0.05 millimeters for pre-polish mark and post-polish mark writing methods respectively with code densities from 12 to 6 characters per centimeter. Higher densities are possible be writing narrower bars which are read by higher resolution readers. In one embodiment of the present invention, bars having a width of 4 mils are employed. Such bars are disposed at a 10 mil center to center spacing leaving a minimum width between adjacent bars of 6 mils. For these dimensions, the bar width is 4 mils and the space width is 6 mils.

The marks are preferably written into the semiconductor substrate by means of a switched Nd:YAG laser operating in dot matrix mode. High quality bars are produced on silicon wafers with non-overlapping dots. Etching plus chemical and mechanical polishing operations transform the marks into more continuous lines.

As indicated above, it is highly desirable for the bar code indicia of the present invention to be able to withstand the harsh environments of VLSI processing methodologies. Temporary process overlays can obstruct part of the bar code and/or reduce the contrast ratio thus producing difficult bar code reading situations. FIGS. 3A and 3B clearly indicate that the codes of the present system, when written on silicon semiconductor material, are capable of surviving exposure to both acidic and alkaline chemicals.

Figure 4B:
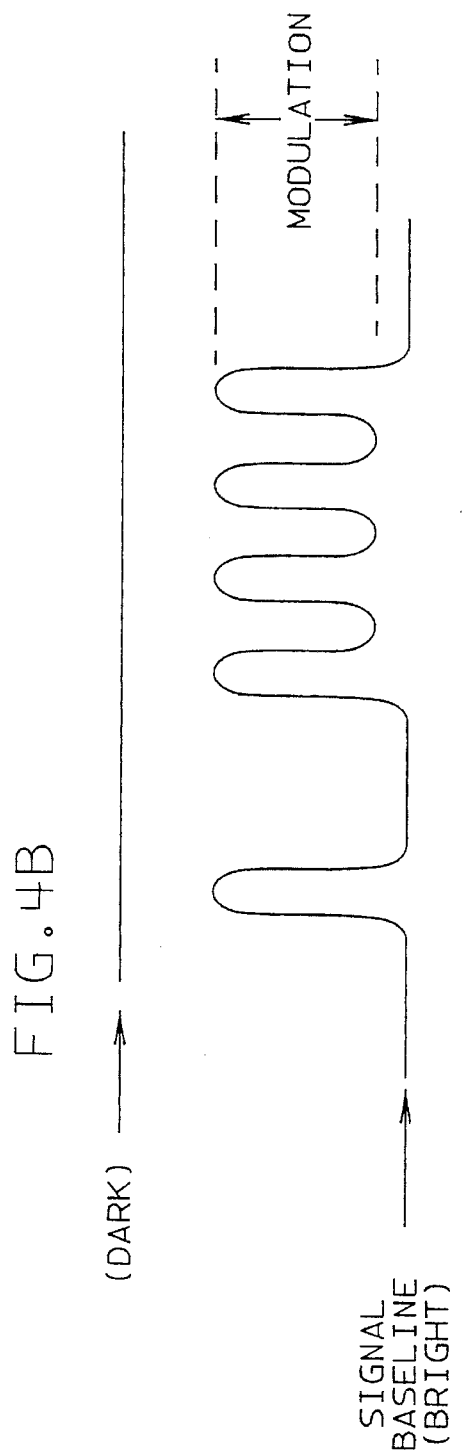
FIG. 4B is an illustration of signals produced in accordance with the present invention by means of the bar code reading system illustrated in FIG. 4A.

Next is considered a system which is capable of reading such marks placed on a wafer or similar substrate. In particular, attention is directed to FIG. 4A wherein it is seen that light source and reflection sensor 10 is capable of directing a source of light, preferably laser light, on to the substrate of wafer 18. The light reflected from wafer 18 is received by the sensor in functional block 10 thus producing an electrical signal such as that shown in FIG. 4B. This signal is amplified by means of amplifier 12 and sent to both peak detector 14 and comparator 16 which produces the desired binary output which is indicative of the concatenated string of characters appearing on wafer 18 in the form of a bar code such as BC412 or BC313.

From the above, it should be appreciated that the bar code system of the present invention is fully capable of satisfying the objects set out herein. In particular, it is seen that the present invention provides single width bar code systems exhibiting inherent self clocking characteristics. Furthermore, it is seen that the codes herein provide for the full range of representation for the alphanumeric character set. Additionally, it is seen that the preferred code herein exhibits a minimum value for the maximum number of spaces occurring between bars. It is further noted that while the codes described specifically herein exhibit an inherent timing subsequence arising out of the leading code bars, that it is also possible to produce codes wherein the subsequence of timing marks occurs either in the middle of the code or in a trailing sequence. Either of these arrangements are possible while still keeping within the spirit of the present invention. Additionally, while the invention herein has been described specifically with reference to the processing of semiconductor wafers and/or chips, it should be noted that the system disclosed herein is generally applicable in whatever systems employ bar codes generally. More particularly, as used herein and in the appended claims, the term "substrate" is not limited to semiconductor materials. A substrate may be paper, such as an adhesively backed label, wood, metal, plastic, compositive or other material capable of being marked or of receiving marking indicia on a portion of its surface. The marking may be provided by ink or by altering surface properties or other physical properties of the material, including but not limited to electrical and/or magnetic properties.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. An article of manufacture having identifying indicia thereon said indicia comprising adjacently positioned groups of sequences of marks, said groups including k substantially uniformly wide marks of a first width, $W_1$, at selectively spaced intervals within said groups, and also including an equal number of blank intervals within said groups, said blank intervals being defined by said marks, said blank intervals having a width which is substantially equal to an integral multiple of a second width, $W_2$, so that each sequence group has substantially the same width and the same number of said substantially uniformly wide marks in each group, and wherein the total blank interval width in each group is equal to $(n-k) W_2$, where n is the number of marks whose width is $W_1$ plus the number of blank positions whose width is $W_2$, and wherein there is at least one sequence group in which the number of distinctly blank interval widths, between the marks in said at least one sequence group, is at least 3.

2. The method of claim 1 in which the number of marks in each group is 4.

3. The method of claim 1 in which said first width is substantially equal to said second width.

4. A method for reading a substrate having a bar code disposed thereon, said method comprising the step of determining the presence or absence of marks and blank intervals which are adjacently positioned in groups of sequences of marks, said groups including k substantially uniformly wide marks of a first width, $W_1$, at selectively spaced intervals within said groups, and also including an equal number of blank intervals within said groups, said blank intervals being defined by said marks, said blank intervals having a width which is substantially equal to an integral multiple of a second width, $W_2$, so that each sequence group has substantially the same width and the same number of said substantially uniformly wide marks in each group, and wherein the total blank interval width in each group is equal to $(n-k)W_2$, where n is the number of marks whose width is $W_1$ plus the number of blank positions whose width is $W_2$, and wherein there is at least one sequence group in which the number of distinctly blank interval widths, between the marks in said at least one sequence group, is at least 3.

5. The method of claim 4 in which the number of marks in each group is 4.

6. The method of claim 4 in which said first width is substantially equal to said second width.

7. A method for marking a substrate with a bar code, said method comprising the step of:

providing adjacently positioned groups of sequences of marks, said groups including k substantially uniformly wide marks of a first width, $W_1$, at selectively spaced intervals within said groups, and also including an equal number of blank intervals within said groups, said blank intervals being defined by said marks, said blank intervals having a width which is substantially equal to an integral multiple of a second width, $W_2$, so that each sequence group has substantially the same width and the same number of said substantially uniformly wide marks in each group, and wherein the total blank interval width in each group is equal to $(n-k)W_2$, where n is the number of marks whose width is $W_1$ plus the number of blank positions whose width is $W_2$, and wherein there is at least one sequence group in which said integral multiple is at least 3.

8. A substrate having identifying information comprising adjacently positioned groups of sequences of marks, said groups including k substantially uniformly wide marks of a first width, $W_1$, at selectively spaced intervals within said groups, and also including an equal number of blank intervals within said groups, said blank intervals being defined by said marks, said blank intervals having a width which is substantially equal to an integral multiple of a second width $W_2$, so that each sequence group has substantially the same width and the same number of said substantially uniformly wide marks in each group, and wherein the total blank interval width in each group is equal to $(n-k)W_2$, where n is the number of marks whose width is $W_1$ plus the number of blank positions whose width is $W_2$ and wherein there is at least one sequence group in which said integral multiple is at least 3.

9. The substrate of claim 8 in which the number of marks in each group is 4.

10. The substrate of claim 8 in which said first width is substantially equal to said second width.

* * * * *

UNITED STATES PATENT AND TRADEMARK OFFICE
CERTIFICATE OF CORRECTION

PATENT NO. : 5,552,591

DATED : September 3, 1996

INVENTOR(S) : Bossen et al.

It is certified that error appears in the above-indentified patent and that said Letters Patent is hereby corrected as shown below:

TITLE PAGE

| | |
|---|---|
| References Cited, <br> U.S. Patent Documents | insert —4,239,151 12/1980 Enser et al.— <br> —4,166,574 9/1979 Yokoyama— <br> —3,558,899 1/1971 Morgan et al.— <br> —3,562,536 2/1971 Brunner et al.— <br> —4,348,803 9/1982 Sasaki— <br> —4,010,355 3/1977 Roehrman et al.— <br> —3,597,045 8/1971 Mathisen— <br> —4,147,295 4/1979 Nojiri et al.— <br> —4,020,357 4/1977 Punis— <br> —3,876,842 4/1975 Bouwhuis— <br> —4,585,931 4/1986 Duncan et al.— <br> —4,567,361 1/1986 Rosenthal— <br> —4,074,852 2/1978 Wescott et al.— <br> —4,329,574 5/1982 Jordan, Jr.— <br> —4,414,468 11/1983 Laurer et al.— <br> —4,638,171 1/1987 Gassmann— <br> —4,450,349 5/1984 Apitz et al.— <br> —3,906,202 9/1975 Meyer— <br> —3,735,350 5/1973 Lemelson— <br> —4,182,481 1/1980 Maussion— |

UNITED STATES PATENT AND TRADEMARK OFFICE
CERTIFICATE OF CORRECTION

PATENT NO. : 5,552,591
DATED : September 3, 1996
INVENTOR(S) : Bossen et al.

It is certified that error appears in the above-indentified patent and that said Letters Patent is hereby corrected as shown below:

References Cited, insert —1484741 9/1977 GB—
Foreign Patent Documents —2137224 2/1972 DE—
—2140948 12/1984 GB—
—1441318 6/1976 GB—
—8810475 12/1988 WO—
—0311087 4/1989 EP—
—1-96920 4/1989 JP—

References Cited, insert —Allais, D.C., "Bar Code Symbology", Feb. 16, 1982, pp. 1-24
Other Publications (and Appendix A and B).—
—Wray, B.R., "The Ultra-High Density Challenge", ID Systems, October 1988, pp. 47-50.—
—Nielson, M.C., "Word Processing Bar Code", IBM Technical Disclosure Bulletin, Vol. 26, No. 1, June 1983, pp. 135-144.—
—Najjar, H. F., "Optimum Coding and Sorting for Coded Mail Systems", IBM Technical Disclosure Bulletin, Vol. 15, No. 9, February 1973, pp. 2807-2808.—
—Gaston, C.A., "Bar-Half Bar Reader System", IBM Technical Disclosure Bulletin, Vol. 16, No. 8, January 1974, pp. 2652-2653.—
—Ett, A.H., "Bar-Half Bar Code Pattern", IBM Technical Disclosure Bulletin, Vol. 23, No. 10, March 1981, p. 4739.
—Metzler, J.C. et al., "Variable Optical Read Head", IBM Technical Disclosure Bulletin, Vol. 18, No. 10, March 1976, pp. 3277-3280.—

UNITED STATES PATENT AND TRADEMARK OFFICE
CERTIFICATE OF CORRECTION

PATENT NO. : 5,552,591
DATED : September 3, 1996
INVENTOR(S) : Bossen et al.

It is certified that error appears in the above-indentified patent and that said Letters Patent is hereby corrected as shown below:

References Cited,     insert    --Howell, D.M. et al., "Self-Clocking Bar Code", IBM Technical
Other Publications                Disclosure Bulletin, Vol. 21, No. 2, July 1978, pp. 696-697.--
--Mansour, M., "Multi-Tiered Condensed Bar Code", IBM Technical Disclosure Bulletin, Vol. 26, No.2, July 1983, pp.766-767.--
--Drew, R.S. et al., "Increased Density Self-Clocking Bar Code", IBM Technical Disclosure Bulletin, Vol. 13, No. 10, March 1971, pp. 3180-3181.--
--Bobart, K.L et al., "Bar Code Record Format", IBM Technical Disclosure Bulletin, Vol. 24, No. 4, Sep. 1981, pp. 1793-1975.--
--Phillips, D. W. et al., "ETAB Bar Code", IBM Technical Disclosure Bulletin, Vol. 21, No. 7, Dec. 1978, pp. 2883-2884.--
--Crouse, W.G. et al., "Decoding Logic for Three-Slit Delta Distance Bar-Code Scanner", IBM Technical Disclosure Bulletin, Vol. 17, No. 1, June 1974, pp. 156-157.--
--Laurer, G.J., "Method for Decoding 'Code 39' or 'Interleaved 2 of 5' Labels", IBM Technical Disclosure Bulletin, Vol. 24, No. 9, February 1982, pp. 4847-4849.--
--Bobart, K.L. et al., "Bar Code Printing for Improved Reliability", IBM Technical Disclosure Bulletin, Vol. 24, No. 8, January 1982, pp. 4326-4330.--
--Broockman, E.C. et al., "Code 39 Candidate Select Technique", IBM Technical Disclosure Bulletin, Vol. 30, No. 4, Sep. 1987, pp.1555-1557.--

UNITED STATES PATENT AND TRADEMARK OFFICE
CERTIFICATE OF CORRECTION

PATENT NO. : 5,552,591
DATED : September 3, 1996
INVENTOR(S) : Bossen et al.

It is certified that error appears in the above-indentified patent and that said Letters Patent is hereby corrected as shown below:

References Cited, Other Publications    insert

—Puster, Jr., L.M., "Self-Checking Bar-Code Reading Method", IBM Technical Disclosure Bulletin, Vol. 17, No. 7, Dec. 1974, pp. 1981-1982.—

—Lynott, J.J. et al., "Alpha-Delta Printer for Matrix Printing and Bar Coding", IBM Technical Disclosure Bulletin, Vol. 14, No. 8, January 1972, p. 2485.—

—Bobart, K.L. et al., "Error Location in Bar Code Scanning", IBM Technical Disclosure Bulletin, Vol. 24, No. 1A, June 1981, p. 142-144.—

—Huth, Jr., H.T., "Error Improvement Delta B Self-Clocking Code", IBM Technical Disclosure Bulletin, Vol. 15, No. 7, December 1972, pp. 2233-2234.—

—Lubert, S.L et al., "First Bar Error Compensation", IBM Technical Disclosure Bulletin, Vol. 26, No. 8, January 1984, p. 3986.—

—Nielson, M.C., "Bar Code Error Correction", IBM Technical Disclosure Bulletin, Vol. 26, No. 1, June 1983, pp. 145-150.—

—Shine, R.D. et al., "Alphanumeric Bar Code", IBM Technical Disclosure Bulletin, Vol. 22, No. 8B, January 1980, pp, 3527-3529.—

—Van Steenis, H., "Error Correcting Bar Coded Font", IBM Technical Disclosure Bulletin, Vol. 7, No. 1, June 1964, p. 48.—

UNITED STATES PATENT AND TRADEMARK OFFICE
CERTIFICATE OF CORRECTION

PATENT NO. : 5,552,591
DATED : September 3, 1996
INVENTOR(S) : Bossen et al.

It is certified that error appears in the above-indentified patent and that said Letters Patent is hereby corrected as shown below:

--Schouhamer Immink, K.A., "Coding Method for High-Density Optical Recording", Philips Journal of Research, Vol. 41, No. 4, 1986, pp. 410-430.--

Signed and Sealed this

Twenty-eighth Day of October, 1997

Attest:

BRUCE LEHMAN

Attesting Officer

Commissioner of Patents and Trademarks

REEXAMINATION CERTIFICATE (4074th)

United States Patent [19]
Bossen et al.

[11] B1 5,552,591
[45] Certificate Issued May 2, 2000

[54] PRESENCE/ABSENCE BAR CODE

[75] Inventors: Douglas C. Bossen, Poughkeepsie; Chin-Long Chen, Wappingers Falls; Frederick H. Dill, South Salem; Douglas S. Goodman, Yorktown Heights; Mu-Yue Hsiao, Poughkeepsie; Paul V. McCann, Hopewell Junction; James M. Mulligan, Poughguag; Ricky A. Rand, Somers, all of N.Y.

[73] Assignee: International Business Machines Corporation, Armonk, N.Y.

Reexamination Request:
No. 90/005,045, Jul. 22, 1998

Reexamination Certificate for:
Patent No.: 5,552,591
Issued: Sep. 3, 1996
Appl. No.: 08/021,298
Filed: Feb. 22, 1993

Certificate of Correction issued Oct. 28, 1997.

Related U.S. Application Data

[63] Continuation of application No. 07/796,163, Nov. 22, 1991, abandoned, which is a continuation of application No. 07/351,902, May 15, 1989, abandoned.

[51] Int. Cl.[7] .................................................. G06K 7/10
[52] U.S. Cl. .................... 235/462.16; 235/470; 235/494; 235/462.01
[58] Field of Search .................................... 235/462, 470, 235/494, 462.01

[56] References Cited

U.S. PATENT DOCUMENTS

| | | |
|---|---|---|
| 1,985,035 | 12/1934 | Kermode et al. . |
| 2,020,925 | 11/1935 | Young . |
| 2,612,994 | 10/1952 | Woodland et al. . |
| 3,585,367 | 6/1971 | Humbarger . |
| 3,731,064 | 5/1973 | Berler et al. . |
| 3,869,598 | 3/1975 | Englund et al. . |
| 3,882,301 | 5/1975 | Nassimbene . |
| 4,534,562 | 8/1985 | Cuff et al. ................................ 273/149 |
| 4,794,239 | 12/1988 | Allais ...................................... 235/462 |
| 5,380,998 | 1/1995 | Bossen et al. .......................... 235/494 |

OTHER PUBLICATIONS

*Computer and People*, vol. 27, No. 2, pp. 12–23, Feb. 1978.
*APICS Bar Code Symposium*, published and available on May 7 & 8, 1985.
*Edgecode ® Symbol Specification*, Apr. 25, 1977, MRC Corporation.
*Code 49 Micro Symbology Specification*, 1989, Intermec Corporation.
*Code 93 Specification*, 1986, Intermec Corporation.
*Code 128 Specification*, 1986, Automatic Identification Manufacturers, Inc.
*The Characteristics and Decodability of the Universal Product Code*, 1975, Savir and Laurer, IBM Systems.
QMS Sales Sheet, 1986, QMS, Inc.

*Primary Examiner*—Harold Pitts

[57] ABSTRACT

A single width bar code exhibiting inherent self clocking characteristics is provided so as to be particularly useful in the identification of semiconductor wafers in very large scale integrated circuit manufacturing processes. The codes described herein are robust, reliable and highly readable even in the face of relatively high variations in scanning speed. The codes are also desirably dense in terms of character representations per linear centimeter, an important consideration in semiconductor manufacturing wherein space on the chips and the wafer is at a premium. Additionally, a preferred embodiment of the present invention exhibits a minimum number for the maximum number of spaces between adjacent bars in code symbol sequences.

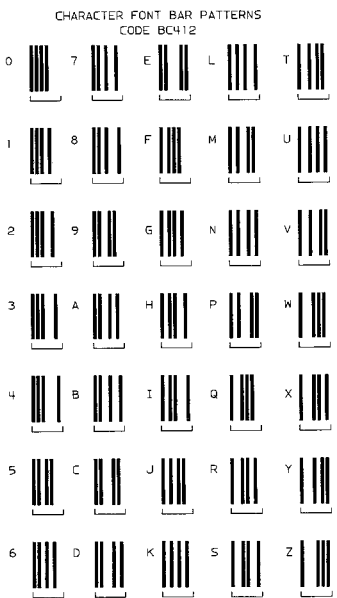

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4, 7 and 8 are determined to be patentable as amended.

Claims 2, 3, 5, 6, 9 and 10, dependent on an amended claim, are determined to be patentable.

1. An article of manufacture having identifying indicia thereon said indicia comprising *at least two* adjacently positioned groups of sequences of marks, *each of* said groups [including] *representing a character selected from a character set of more than 10 characters, wherein each said group in said character set includes* k substantially uniformly wide marks of a first width, $W_1$, *and wherein each of said marks within each group in said character set is separated from other of said marks* at selectively spaced [intervals] *positions* within said groups, and *wherein each of* said groups *in said character set* also [including] *includes* an equal number of blank intervals [within said groups], said blank intervals being defined by said marks, said blank intervals having a width which is substantially equal to an integral multiple of a second width, $W_2$, so that each sequence group *in said character set* has substantially the same width and the same number of said substantially uniformly wide marks in each group, and wherein the total blank interval width in each group is equal to $(n-k) W_2$, where n is the number of marks whose width is $W_1$ plus the number of blank positions whose width is $W_2$, *and wherein in all of said groups of the character set, the width of each blank interval is independent of the width of any other blank interval in each said group, said resultant overall sequence of marks and blank intervals of said adjacent groups of the character set also being such that, within each said groups of marks and blank intevals, there is a subsequence of two adjacent positions and at least one non-adjacent position, such that said subsequence is spaced apart from an identical subsequence in an adjacent group by a fixed distance*, and wherein there is at least one sequence group *representing a selected character* in which the number of distinctly blank interval widths, between the marks in said at least one sequence group, is at least 3.

4. A method for reading a substrate having a bar code disposed thereon, said method comprising the step of determining the presence or absence of marks and blank intervals which are adjacently positioned in groups of *at least two* sequences of marks, *each of* said groups [including] *representing a character selected from a character set of more than 10 characters, wherein each said group in said character set includes* k substantially uniformly wide marks of a first width, $W_1$, *and wherein each of said marks within each group in said character set is separated from other of said marks* at selectively spaced [intervals] *positions* within said groups, and *wherein each of* said groups *in said character set* also [including] *includes* an equal number of blank intervals [within said groups], said blank intervals being defined by said marks, said blank intervals having a width which is substantially equal to an integral multiple of a second width, $W_2$, so that each sequence group *in said character set* has substantially the same width and the same number of said substantially uniformly wide marks in each group, and wherein the total blank interval width in each group is equal to $(n-k)W_2$, where n is the number of marks whose width is $W_1$ plus the number of blank positions whose width is $W_2$, *wherein in all of said groups of the character set, the width of each blank interval is independent of the width of any other blank interval in each said group, said resultant overall sequence of marks and blank intervals of said adjacent groups of the character set also being such that, within each said groups of marks and blank intervals, there is a subsequence of two adjacent positions and at least one non-adjacent position, such that said subsequence is spaced apart from an identical subsequence in an adjacent group by a fixed distance*, and wherein there is at least one sequence group *representing a selected character* in which the number of distinctly blank interval widths, between the marks in said at least one sequence group, is at least 3.

7. A method for marking a substrate with a bar code, said method comprising the step of providing *at least two* adjacently positioned groups of sequences of marks, *each of* said groups [including] *representing a character selected from a character set of more than 10 characters, wherein each said group in said character set includes* k substantially uniformly wide marks of a first width, $W_1$, *and wherein each of said marks within each group in said character set is separated from other of said marks* at selectively spaced [intervals] *positions* within said groups, and *wherein each of* said groups *in said character set* also [including] *includes* an equal number of blank intervals [within said groups], said blank intervals being defined by said marks, said blank intervals having a width which is substantially equal to an integral multiple of a second width, $W_2$, so that each sequence group *in said character set* has substantially the same width and the same number of said substantially uniformly wide marks in each group, and wherein the total blank interval width in each group is equal to $(n-k)W_2$, where n is the number of marks whose width is $W_1$ plus the number of blank positions whose width is $W_2$, *wherein in all of said groups of the character set, the width of each blank interval is independent of the width of any other blank interval in each said group, said resultant overall sequence of marks and blank intervals of said adjacent groups of the character set also being such that, within each said groups of marks and blank intervals, there is a subsequence of two adjacent positions and at least one non-adjacent position, such that said subsequence is spaced apart from an identical subsequence in an adjacent group by a fixed distance*, and wherein there is at least one sequence group *representing a selected character* in which said integral multiple is at least 3.

8. A substrate having identifying information comprising *at least two* adjacently positioned groups of sequences of marks, *each of* said groups [including] *representing a character selected from a character set of more than 10 characters, wherein each said group in said character set includes* k substantially uniformly wide marks of a first width, $W_1$, *and wherein each of said marks within each group in said character set is separated from other of said marks* at selectively spaced [intervals] *positions* within said groups, and *wherein each of said groups in said character set* also [including] *includes* an equal number of blank intervals [within said groups], said blank intervals being defined by said marks, said blank intervals having a width which is substantially equal to an integral multiple of a second width $W_2$, so that each sequence group *in said character set* has substantially the same width and the same number of said substantially uniformly wide marks in each group, and wherein the total blank interval width in each group is equal to $(n-k)W_2$, where n is the number of marks whose width is $W_1$ plus the number of blank positions whose width is $W_2$ *and wherein in all of said groups of the character set, the width of each blank interval is independent of the width of any other blank interval in each said group, said resultant overall sequence of marks and blank intervals of said adjacent groups of the character set also being such that, within each said groups of marks and blank intervals, there is subsequence of two adjacent positions and at least one non-adjacent position, such that said subsequence is spaced apart from an identical subsequence in an adjacent group by a fixed distance,* and wherein there is at least one sequence group *representing a selected character* in which said integral multiple is at least 3.

* * * * *